United States Patent [19]

Skerlos

[11] 3,812,921

[45] May 28, 1974

[54] VIDEO SIGNAL PROCESSING SYSTEM AND METHOD WITH ABOVE-WHITE-LEVEL NOISE INVERSION

[75] Inventor: Peter C. Skerlos, Arlington Heights, Ill.

[73] Assignee: Zenith Radio Corporation, Chicago, Ill.

[22] Filed: July 24, 1972

[21] Appl. No.: 274,766

[52] U.S. Cl. .......................... 178/7.3 R, 178/DIG. 12

[51] Int. Cl. .......................... H04n 5/44

[58] Field of Search... 307/318; 178/DIG. 12, 7.3 R, 178/7.3 S, 7.5 R, 7.5 S

[56] References Cited

UNITED STATES PATENTS

| | | | |
|---|---|---|---|
| 2,783,377 | 2/1957 | Wofford | 178/DIG. 12 |
| 2,829,247 | 4/1958 | Thomas, Jr. | 178/7.5 R |
| 3,492,510 | 1/1970 | Mathews | 307/318 |
| 3,715,488 | 2/1973 | Takise et al. | 178/DIG. 12 |

*Primary Examiner*—Robert L. Griffin
*Assistant Examiner*—Marc E. Bookbinder
*Attorney, Agent, or Firm*—Nicholas A. Camasto; John H. Coult; John J. Pederson

[57] ABSTRACT

This disclosure depicts method and apparatus for processing a television video signal, particularly for processing a noise-adulterated video signal as developed by synchronous-type video detectors. The disclosed method and apparatus involves sensing in a video signal developed by a synchronous-type video detector noise components having amplitude levels exceeding a predetermined reference level above a level which corresponds to a maximum white video display. A modified video signal is developed for supply to the luminance controls of a video image display device. In the modified signal the sensed above-white-level noise energy is inverted so as to prevent over-driving of the associated image display device. The noise-adulterated video signal from the video detector is supplied directly to a sync separator and AGC stage without noise inversion so as to avoid the introduction of a spurious DC component capable of falsely altering the video signal level relative to an AGC reference level.

7 Claims, 5 Drawing Figures

VIDEO SIGNAL PROCESSING SYSTEM AND METHOD WITH ABOVE-WHITE-LEVEL NOISE INVERSION

CROSS REFERENCE TO RELATED APPLICATION

This application relates to, but is not dependent upon, my copending application Ser. No. 116,319, filed Feb. 18, 1971, now U.S. Pat. No. 3,760,094 granted Sept. 18, 1973, and assigned to the assignee of this application.

BACKGROUND OF THE INVENTION

This invention has application in television receivers having signal processing systems which employ synchronous-type detectors, herein intended to mean detectors of the type which beat a reference wave with the incoming IF videomodulated carrier to detect the video signal, as opposed to diode-type "envelope" detectors. The said reference wave may be derived from the received television signal, or may be independently generated, as by means of an oscillator in the receiver. This invention is particularly addressed to the effects of impulse noise components in video signals derived by such synchronous-type detectors, and specifically to the effects of above-white-level noise, that is noise exceeding a nominal 100 percent modulation level.

It is known that, unlike diode-type envelope detectors which do not respond to above-white-level noise, synchronous-type detectors reproduce such noise substantially linearly. Television receivers are designed such that the intelligence portions of the video signal do not exceed a maximum modulation level established by Federal Communications Commission regulations. Video modulation in excess of this level is apt to overdrive the luminance controls of the assoicated image display device (a cathode ray tube, for example), resulting in serious image degrading effects commonly termed "blooming."

The referent copending application discloses a circuit for preventing such blooming. In the referent application a signal clipping circuit is disclosed which clips above-white-level noise from the video signal before introduction of the video signal into the luminance channel. Whereas clipping of such above-white-level noise components is effective to prevent blooming, the noise components are nevertheless reproduced falsely at a brightness corresponding to the clipping level, that is, as white information. Further, the clipping operation introduces an instantaneous spurious DC component in the video signal which alters the amplitude level of the incoming video signal. The introduction of such a noise-clipped video signal into a sync separator and AGC stage is undesirable because of the critical reliance of this state on the amplitude of the video signal sync pulses as a true measure of the strength of the incoming video intelligence signal.

Elaborating, as is well known, in typical sync signal separating circuits the sync pulses are stripped off at a pre-set DC reference level corresponding to the base level of the sync pulses. Any sudden adjustment of the video signal level may cause the sync pulses to be stripped off at an incorrect height.

Sync signal processing circuits typically also include AGC (automatic gain control) circuits which sense the instantaneous amplitude of the incoming video signal and generate a control signal which is fed back to a preceding amplifier stage to stabilize the amplitude of the video signal. Such AGC circuits typically provide a DC reference level against which the tips of the sync pulses are compared in order to derive the control signal.

It is evident then that because of the critical comparisons made in the sync separator and AGC stage with reference amplitude levels on the sync pulses, that any artificially introduced DC component which tends to falsely alter the amplitude of the incoming video signal, and thus the amplitude of the sync pulses, will cause a degradation in the synchronization and AGC functions of the receiver.

OBJECTS OF THE INVENTION

It is a general object of this invention to provide an improved method and system for processing video signals in a television receiver. It is a less general object to provide an improved video signal processing method and system for use in receivers having synchronous-type detectors.

It is a specific object of this invention to provide an improved video signal processing method and system for processing a video signal having above-white-level noise components in such a way as to prevent overdriving of the luminance controls of an associated image display device, while at the same time preventing introduction of a false DC component into the receiver's sync separator and AGC stage which might tend to degrade the synchronizing and AGC functions thereof.

BRIEF DESCRIPTION OF THE DRAWINGS

The features of the present invention which are believed to be novel and unobvious are set forth with particularity in the appended claims. The invention itself, together with further objects and advantages thereof may best be understood by reference to the following description taken in conjunction with the accompanying drawings in which:

FIG. 1 illustrates in block diagram form a color television receiver representing a preferred implementation of the principles of this invention. The receiver is shown as including an antenna 10 for receiving a televised signal coupled to a tuner 12. The tuner 12 develops from an incoming RF (radio frequency) carrier signal an IF (intermediate frequency) carrier signal for processing in an IF stage 14. As is well known, the IF stage 14 filters and amplifies the IF carrier signal according to prescribed specifications and prepares it for detection.

Figures 1, 2A, 2B:
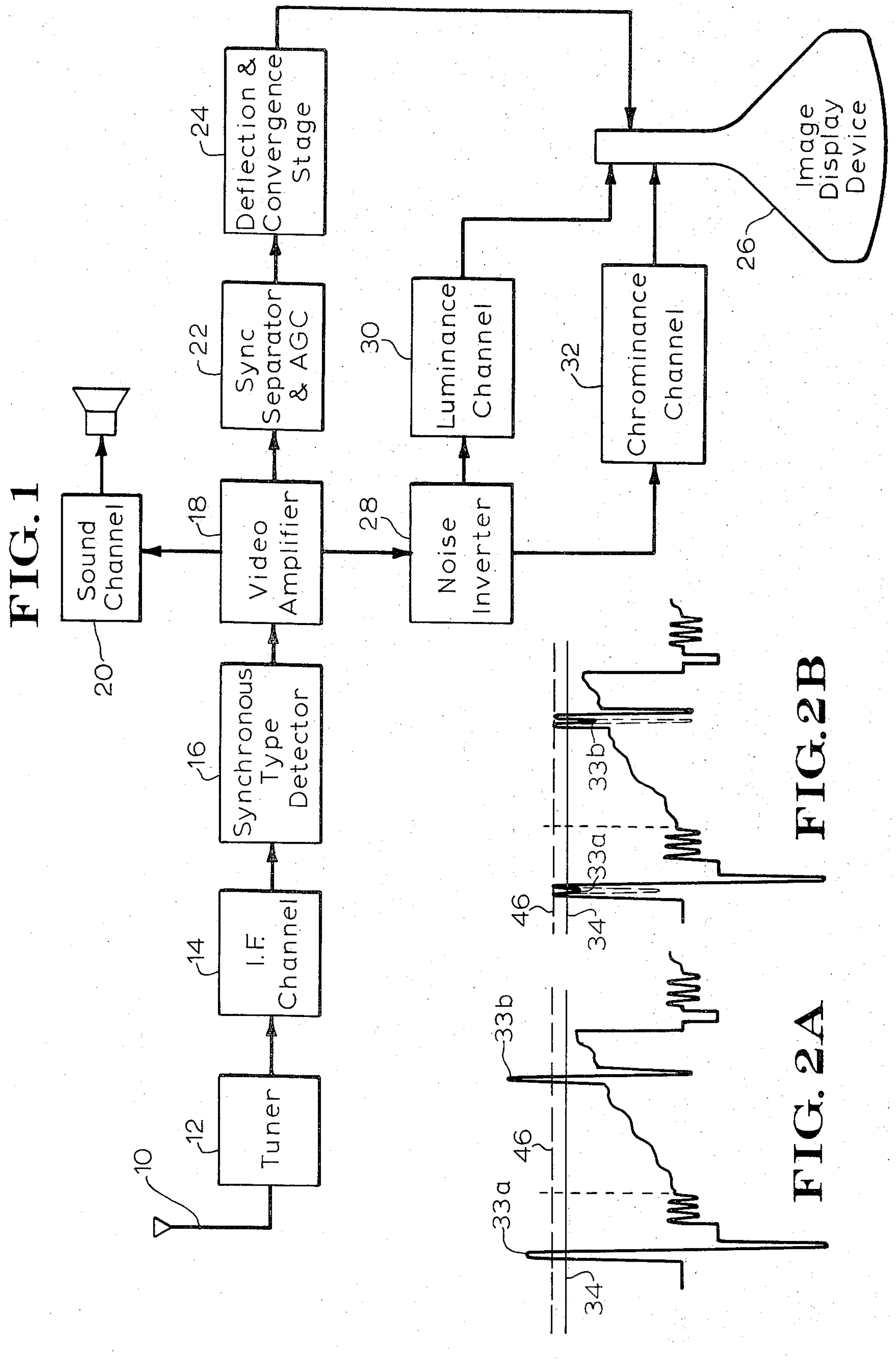
FIG. 1 is a block diagram of a color television receiver which incorporates the teachings of the present invention.
FIGS. 2A and 2B illustrate a representative video signal waveform having above-white-level noise components before and after noise inversion according to this invention.

As discussed in some detail above, this invention is applicable to television receivers of the type which employ synchronous-type detectors, as defined above. The FIG. 1 system is illustrated as including a synchronous-type detector 16 which may be of any of a number of known types which beat or multiply the IF video carrier signal with a reference wave of like frequency and predetermined phase relationship to detect the video information.

The video signal developed in the synchronous-type detector is supplied to a video amplifier 18 in which the signal is amplified and from which the audio signal is derived for supply to a sound channel 20. Completing the system, a sync separator and AGC stage 22 coupled to the amplifier 18 derives synchronizing and AGC information from the video signal. The sync separator and AGC stage 22 develops an AGC control signal for stabilizing the video signal and also detects synchronizing information for supply to a deflection and convergence stage 24. The deflection and convergence stage 24 prepares suitable deflection and convergence signals for driving an image display device 26, which may be a cathode ray tube or other suitable video display device.

From the video amplifier 18 are also derived luminance and chrominance signals which are processed in a noise inverter 28, to be discussed in detail below, and supplied to luminance and chrominance channels 30, 32 in which luminance and chrominance signals appropriate for controlling the color and brightness of image display device 26 are developed. It may be desirable in certain applications to bypass the chrominance channel 32 with the noise-inverted video signal.

As discussed above, it is known that synchronous-type detectors are capable of detecting above-white-level impulse noise components on the video signal. Thus the video signal supplied to the video amplifier 18 will, in normal operating conditions, contain random noise components which may be of sufficiently great amplitude to extend well above the maximum white amplitude level into the region herein termed the "above-white-level" (over 100 percent modulation) region. See FIG. 2A wherein the tips of such above-white-level noise components are shown at 33*a*, 33*b*. The white level, corresponding to 100 percent modulation, is shown in FIG. 2A at 34.

As described above and as disclosed in my earlier application, the reduction or suppression of above-white-level noise before introduction into a receiver's sync separator and AGC stage artificially introduces an instantaneous DC component which is apt to degrade the performance of the sync separation and automatic gain control functions performed by stage 22. However, because of the blooming effects caused by above-white-level noise in the luminance control signals, it is desirable that the video signal supplied to the luminance channel 30 be operated upon so as to suppress above-white-level noise before application thereto.

It is an object of the invention described and claimed in my referent application to provide a video signal processing system which precludes degradation of the synchronizing and AGC functions which would result from generation of the described spurious noise-induced DC components, as by the supply to the sync separator and AGC processing stage of a video signal on which the above-white-level noise components had not been suppressed. However, in order to prevent blooming in the image display device, the video signal is operated on to suppress above-white-level noise before introduction into the luminance channel. This invention in one aspect is directed to the provision of an improved signal processing system in which the above-white-level noise is inverted, rather than being clipped.

As briefly discussed above, the clipping of above-white-level noise components results in the reproduction of noise on the associated image display device at a brightness level corresponding to maximum white – an undesirable effect. However, inversion of above-white-level noise components results in the reproduction of the noise on the associated image display device as a shade of grey or black, depending upon the amplitude of the noise components and the inverted noise gain produced by the noise inverter. It has been found that noise displayed at a grey or black level is less degrading to image quality than if it is displayed at the maximum white level.

The noise inverter 28 constitutes one aspect of this invention and will now be described. In accordance with this invention the noise inverter 28 includes means for sensing noise components in the video signal having amplitude levels exceeding a predetermined reference level corresponding to maximum white video display and for developing a modified video signal in which the sensed above-reference noise components are inverted.

Figure 3:
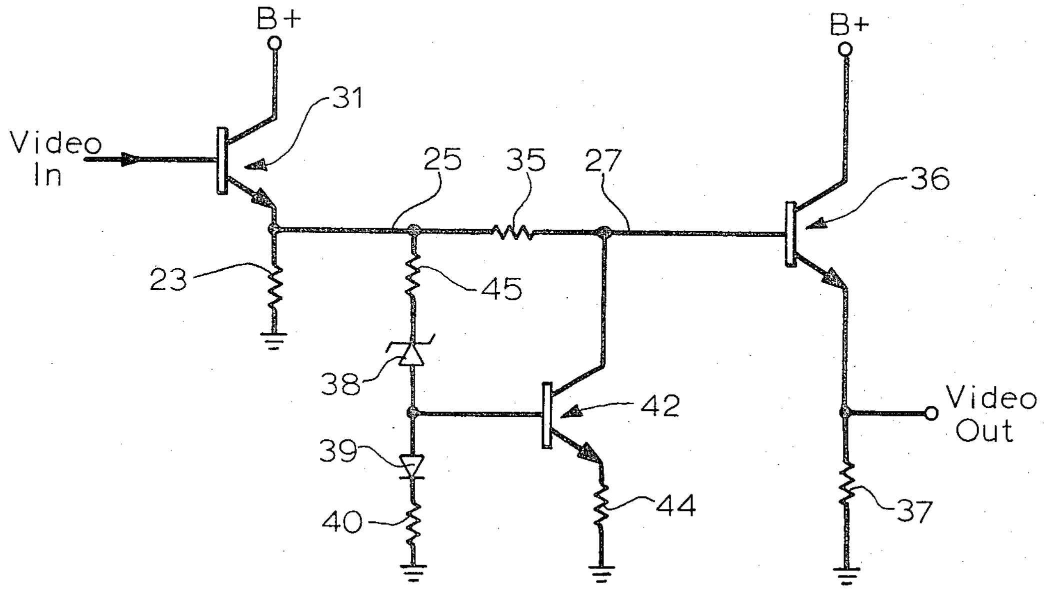
FIG. 3 is a schematic diagram of a noise inversion circuit embodying the principles of one aspect of this invention.

FIG. 3 illustrates a preferred noise inversion circuit for implementing the principles of this invention. FIG. 3 shows an emitter-follower amplifier 31 developing a video signal across load resistor 23 for application to input lead 25 of the noise inversion circuit. The video signal is fed through coupling resistor 35 and output lead 27 to the base electrode of an output emitter-follower amplifier comprising a transistor 36 and a load resistor 37.

The circuit includes a voltage sensing branch comprising a threshold sensitive device, here shown as a Zener diode 38, a resistor 45, a diode 39 and a resistor 40. An amplifier comprising a transistor 42 has its base electrode connected between the diodes 38 and 39. The collector electrode of transistor 42 is coupled to the base electrode of transistor 36; its emitter electrode is connected to a resistor 44.

In operation, to provide a tolerance which will ensure against suppression of highlights in the reproduced images, the circuit parameters are preferably adjusted such that the Zener diode 38 will break down at a reference voltage level which is a few tenths of a volt above the maximum white level 34. This reference level is illustrated at 46 in FIG. 2A. Impulse noise components which exceed the reference level 46 cause the Zener diode 38 to break down, resulting in the application of the above-reference noise componets directly to the base electrode of transistor 42.

The above-reference noise components applied to the base electrode of transistor 42 are amplified, appearing in inverted form on the video signal at the base electrode of transistor 36. An output video signal with the noise components inverted is developed across load resistor 37 of transistor 36. An output video signal is thus developed for supply to a luminance channel on which above-white-level noise components drive the associated image reproducer toward black, rather than into the above-white-level region. FIG. 2B shows the video signal waveform of FIG. 2A, but with the noise components inverted, as described.

The amplitude of the inverted noise components can be adjusted by establishing a predetermined noise gain across transistor 42. For unity gain, the resistors 40 and 44 are selected to have substantially equal values as are the resistors 45 and 35. Further, the diode 39 is also caused to have a foward impedance equal to the impedance of the emitter-base junction of transistor 42.

To establish an inverted noise gain other than unity, the relative values of the resistors 45 and 35, or of the resistors 40 and 44, may be adjusted. For example, to produce an inverted noise gain greater than unity, resistor 35 is selected to be of greater value than resistor 45; alternatively, resistor 40 can be selected to have a value greater than that of resistor 44. It has been found that minimum degradation of the video display by above-white-level noise is achieved if a gain is established for transistor 42 which causes the inverted noise peaks to be driven into the black region, as shown in dotted lines in FIG. 2B.

Figure 4:
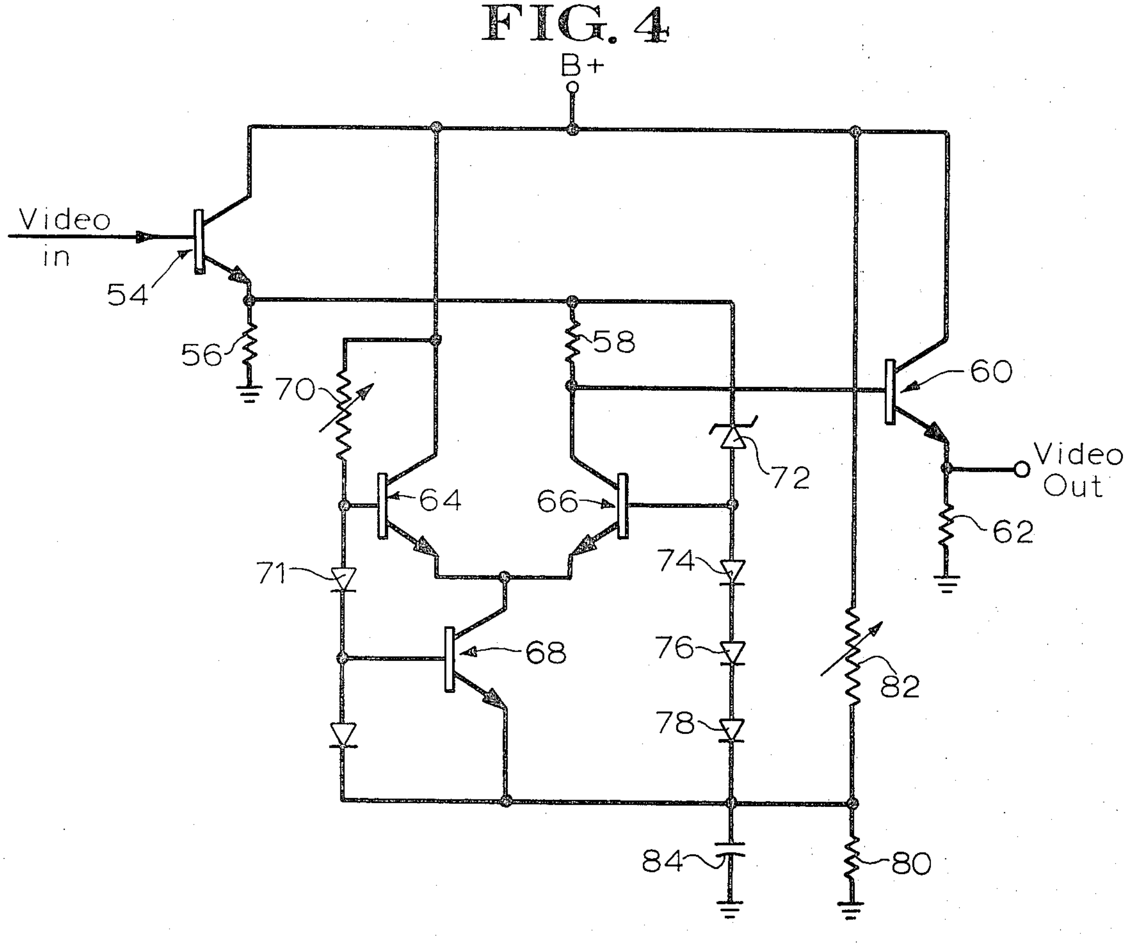
FIG. 4 is a schematic diagram of an alternative noise inversion circuit. DESCRIPTION OF THE PREFERRED EMBODIMENTS

FIG. 4 is a schematic diagram of an alternative circuit which may be employed to accomplish the inversion of above-white-level noise in accordance with this invention. The illustrated FIG. 4 circuit is shown as including at its input an emitter-follower transistor amplifier 54 which receives the input video signal and which develops its output across load resistor 56. The video signal developed across resistor 56 is supplied through a resistor 58 to the base of a second emitter-follower transistor amplifier comprising a transistor 60 and a load resistor 62. An output video signal suitable for application to the luminance channel 30 of the FIG. 1 television receiver is developed across load resistor 62.

The circuit includes a pair of transistors 64, 66 connected in a differential amplifier arrangement. A transistor 68, the collector of which is coupled to the emitter of transistors 64, 66, serves as a constant current source. The transistor 64 is normally biased to full conduction by appropriate adjustment of bias resistor 70. Diode 71 serves to prevent back-biasing of the base-emitter junction of transistor 64.

A voltage sensing circuit branch includes a Zener diode 72, a tandem arrangement of diodes 74, 76 and 78 and a resistor 80. The threshold voltage at which the Zener diode 72 is set to break down is adjusted by providing an appropriate voltage drop across resistor 80 is established by adjustment of a variable resistor 82 connected between resistor 80 and a source of B+ bias voltage for the circuit. Capacitor 84 is an AC bypass for resistor 80.

The noise inversion circuit is preferably set up such that the Zener diode 72 will break down at a reference voltage level which is slightly greater (a few tenths of a volt, for example) than the maximum white level voltage of the video signal. This reference level may be that level 46 shown in FIG. 2A.

In operation, above-white-level noise components exceeding the pre-set reference level 46 will cause the Zener diode 72 to break down and the above-reference tips of the noise components (See 33*a*, 33*b* in FIG. 2A) to be applied to the base of transistor 66. The application of the above-reference noise components to the base of transistor 66 will vary the conduction thereof, causing the voltage at the collector of transistor 66 to follow the above-reference noise components, but with inverted polarity. Transistor 60, having its base electrode coupled to the collector of transistor 66 develops across its load resistor 62 the output video signal on which is superimposed inverted noise components.

The setting of bias resistor 70 determines the location of the negative noise peaks, and thus the peak black level at which noise components will be displayed.

The invention is not limited to the particular details of construction of the embodiments depicted and other modifications and applications are contemplated. Certain changes may be made in the above-described methods and apparatus without departing from the true spirit and scope of the invention herein involved and it is intended that the subject matter in the above depiction shall be interpreted as illustrative and not in a limiting sense.

1. For use in a television receiver having a synchronous-type video detector developing from an IF carrier a video signal having above-white-level impulse noise components, a sync signal separator stage responsive to a predetermined threshold sync signal amplitude level, and a luminance channel for driving a video display device, a video signal processing system comprising:
  - means for supplying the video signal with noise components from the video detector to the sync signal separator stage;
  - noise inverting means for sensing above-white-level noise components in said video signal having amplitude levels exceeding a predetermined reference level at least as great as a level corresponding to a maximum white video display and for developing a modified video signal in which the sensed above-reference noise components are inverted; and
  - means for supplying said modified video signal to said luminance channel.

2. The apparatus defined by claim 1 wherein said noise inverting means comprises;
  - input lead means for receiving a video signal having above-white-level noise components and output lead means, between which input and output lead means is connected a coupling impedance;
  - amplifier means having an input terminal and having an output terminal coupled to said output lead means, said amplifier means having a predetermined gain; and
  - voltage sensing means coupled to said input lead means and including a threshold sensitive means for sensing noise components on the video signal exceeding said reference level and for applying the detected above-reference noise components to said input terminal of said amplifier means, such that said video signal is developed at said output lead means with said above-reference noise components appearing 0n said video signal inverted and with said predetermined gain.

3. The apparatus defined by claim 2 wherein said predetermined gain of said amplifier means is selected to cause said inverted noise components to have an amplitude level corresponding to a black display on an associated video display device.

4. The apparatus defined by claim 3 wherein said noise inverting means includes means for selecting said predetermined gain of said amplifier means.

5. The apparatus defined by claim 3 wherein said threshold sensitive means comprises a Zener diode.

6. A method of processing a video signal developed by a synchronous-type video detector having above-white-level impulse noise components for supply to a video display device, comprising:
  - sensing in the video signal from the video detector above-white-level noise components having amplitude levels exceeding a predetermined reference level at least as great a level which corresponds to a maximum white video display;

developing and supplying to luminance controls of a video display device a modified video signal in which the sensed above-white-level noise components are inverted so as to prevent overdriving of the image display device; and supplying the noise-adulterated video signal from the video detector directly to a sync signal processing stage without noise inversion so as to avoid introduction to said stage of a noise-induced DC voltage component capable of falsely altering the video signal amplitude relative to said predetermined reference level.

7. A method of processing a video signal developed by a synchronous-type video detector having above-white-level impulse noise components for supply to a video display device, comprising:

sensing in the video signal from the video detector above-white-level noise components having amplitude levels exceeding a predetermined reference level at least as great a level which corresponds to a maximum white video display;

inverting the detected above-reference noise components;

subjecting the inverted noise components to a predetermined selected amplification such that the amplified inverted noise components have an amplitude level which corresponds to a black display on an assoicated video display device;

superimposing upon the video signal said amplified inverted noise components to produce a modified video signal for supply to the luminance controls of an associated video display device; and supplying the noise-adulterated video signal from the video detector directly to a sync signal processing stage without noise inversion so as to avoid introduction to said stage of a noise-induced DC voltage component capable of falsely altering the video signal amplitude relative to said predetermined reference level.

* * * * *